US 10,997,707 B1

(12) United States Patent
Katz et al.

(10) Patent No.: US 10,997,707 B1
(45) Date of Patent: May 4, 2021

(54) AERIAL AND SPACE-BASED HYPERSPECTRAL IMAGING SYSTEM AND METHOD FOR HYDROCARBON AND CHEMICAL INDUSTRY REGULATORY COMPLIANCE, LEAK DETECTION AND PRODUCT SPECIATION

(71) Applicant: Orbital Sidekick, Inc., San Francisco, CA (US)

(72) Inventors: Daniel L. Katz, San Francisco, CA (US); Tushar Prabhakar, San Francisco, CA (US)

(73) Assignee: Orbital Sidekick, Inc., San Francisco, CA (US)

( * ) Notice: Subject to any disclaimer, the term of this patent is extended or adjusted under 35 U.S.C. 154(b) by 44 days.

(21) Appl. No.: 16/287,947

(22) Filed: Feb. 27, 2019

Related U.S. Application Data

(60) Provisional application No. 62/635,921, filed on Feb. 27, 2018.

(51) Int. Cl.
*G06T 7/00* (2017.01)
*G01M 3/38* (2006.01)
*G01M 3/00* (2006.01)

(52) U.S. Cl.
CPC .......... *G06T 7/0004* (2013.01); *G01M 3/002* (2013.01); *G01M 3/38* (2013.01); *G06T 2207/10036* (2013.01); *G06T 2207/30184* (2013.01); *G06T 2207/30188* (2013.01)

(58) Field of Classification Search
CPC ................ G01M 3/38; G01M 3/002; G01N 2021/1795; G01N 2021/3531; G01N 21/3103; G01N 21/3504; G01V 8/10; G06K 9/00791; G06K 9/0004; G06T 2207/10036; G06T 2207/30184; G06T 2207/30188
See application file for complete search history.

(56) References Cited

U.S. PATENT DOCUMENTS

| | | | | |
|---|---|---|---|---|
| 9,064,308 | B2 * | 6/2015 | Flanders | G06T 5/002 |
| 9,151,864 | B2 | 10/2015 | Rodney et al. | |
| 9,500,634 | B2 * | 11/2016 | Islam | G01N 21/35 |
| 2009/0271719 | A1 | 10/2009 | Clare et al. | |
| 2012/0242822 | A1 * | 9/2012 | Rodney | G01V 8/10 |
| | | | | 348/81 |

(Continued)

OTHER PUBLICATIONS

M. Fingas, C. Brown, "Review of oil spill remote sensing", Marine pollution bulletin 83 (1) 2014 pp. 9-23. (Year: 2014).*

(Continued)

*Primary Examiner* — Ian L Lemieux
(74) *Attorney, Agent, or Firm* — Kirk Dorius; Dorius Law PC

(57) ABSTRACT

An improved leak detection system for oil and gas pipelines and the like, including submerged or buried structures, the system including an aerial- or space-based platform with GPS and Attitude Determination and Control System (ADCS) capability, the platform connected to a hyperspectral imaging sensor, the system including processor and memory structured with a vegetative index such that chemical and hydrocarbon leaks are detected within regulatorily-approved time limits based on changes in the vegetative index.

14 Claims, 9 Drawing Sheets
(4 of 9 Drawing Sheet(s) Filed in Color)

(56) References Cited

U.S. PATENT DOCUMENTS

| | | | |
|---|---|---|---|
| 2015/0254800 A1* | 9/2015 | Johnson | G06Q 50/02 |
| | | | 382/141 |
| 2015/0323449 A1 | 11/2015 | Jones et al. | |
| 2016/0069743 A1* | 3/2016 | McQuilkin | A22B 5/007 |
| | | | 356/416 |
| 2017/0154440 A1* | 6/2017 | Sima | G06T 7/579 |
| 2018/0046910 A1 | 2/2018 | Greene | |
| 2018/0259418 A1* | 9/2018 | Dudek | G01M 17/007 |
| 2018/0341859 A1* | 11/2018 | Araujo | G06T 7/0004 |
| 2019/0003984 A1* | 1/2019 | Kester | G01J 3/2823 |

OTHER PUBLICATIONS

Peterson, S.H., Roberts, D.A., Beland, M., Kokaly, R.F., Ustin, S.L., "Oil detection in the coastal marshes of Louisiana using MESMA applied to band subsets of AVIRIS data". Remote Sens. Environ. 159, 2015 pp. 222-231 (Year: 2015).*

Gruninger et al., "The sequential maximum angle convex cone (SMACC) endmember model," SPIE Bellingham, WA Apr. 30, 2004 (Year: 2004).*

Ralf Habel, Michael Kudenov, Michael Wimmer, "Practical spectral photography", Computer Graphics Forum (Proceedings EUROGRAPHICS 2012), 31(2) (2012) 449-458. (Year: 2012).*

Thorpe et al; "Retrieval techniques for airborne imaging of methane concentrations using high spatial and moderate spectral resolution: application to AVIRIS", Atmos. Meas.Tech., 7, 491-506, 2014.

Thompson, et al. "Space-based remote imaging spectroscopy of the Aliso Canyon CH4 superemitter", Geophysical Research Letters, 43, doi: 10.1002/2016GL069079, 2016.

Shaw et al; "Leak Detection Study—DTPH56-11-D-000001", Dec. 10, 2012.

Phemsa Pipeline Library, (Mar. 17, 2017), https://www.phmsa.dot.gov/pipeline/library.

Pipeline Monitoring Systems Market worth 8.72 Billion USD by 2026, http://www.marketsandmarkets.com/PressReleases/pipeline-monitoring-system.asp.

Pipeline Safety Market worth 8.67 Billion USD by 2021, http://www.marketsandmarkets.com/PressReleases/pipeline-safety.asp.

* cited by examiner

AERIAL AND SPACE-BASED HYPERSPECTRAL IMAGING SYSTEM AND METHOD FOR HYDROCARBON AND CHEMICAL INDUSTRY REGULATORY COMPLIANCE, LEAK DETECTION AND PRODUCT SPECIATION

CROSS REFERENCE TO RELATED APPLICATIONS

This application claims priority to U.S. provisional application Ser. No. 62/635,921 filed on Feb. 27, 2019, which is incorporated herein in its entirety by reference.

FIELD OF THE INVENTION

The invention lies in the field of aerial- and space-based hyperspectral imaging systems and methods as applied to hydrocarbon and chemical industry regulatory compliance and hydrocarbon and chemical infrastructure integrity validation, leak detection and product speciation.

BACKGROUND OF THE INVENTION

Long-Felt Need

Product spill incidents, large and small, have continued to disrupt the oil, gas and chemical industries through the years. Empirical data indicates that the total number of pipeline incidents is increasing in absolute terms. Over a quarter of all pipeline incidents are first identified and reported to the authorities by the public. Worse yet, there have been human casualties reported in numerous incidents.

Focusing on US pipeline leaks in 2016, there were over 400 reported incidents that collectively resulted in over 1,100 days of pipeline downtime. Approximately $3 billion in lost revenues have been estimated for those midstream operators in 2016 alone.

The oil and gas and chemical industries recognize the seriousness of this challenge. For example, the refining industry alone spends $9 billion annually on Operations Excellence and Integrity programs, Reputation Preservation/PR, and Leak Prevention (notably following third-party damage or right of way (ROW) changes.

Focal industry needs in hydrocarbon leak detection include:
1. efficiency, and prioritization of resources;
2. enhanced spill detection (smaller volume detection and earlier detection);
3. spill awareness generated through internal capability rather than from the Public; and
4. quicker and more efficient emergency response—spill tracking, resource deployment.

Current Systems, Problems and Industry Expectations

In terms of current alternative compliance and inspection methodologies, the oil, gas and chemical industries predominantly utilize visual air surveillance techniques and ground sensors for monitoring infrastructure and for complying with Pipeline and Hazardous Materials Safety Administration (PHMSA) and Department of Transportation (DOT) regulations.

Problems with visual air patrol are that aerial traffic is heavily regulated, subject to weather restrictions, and has limited data capture capability as compared to ground sensors. To the extent a pilot's view is relied upon, visual air perspectives may be obstructed and a pilot's conclusions may be limited to subjective visual interpretations.

Ground monitoring includes Forward Looking Infrared (FLIR), foot patrol, and electronic sensors. Electric sensors, such as fiber-optics, however, are capital intensive and implausible to install on existing underground pipelines.

Notwithstanding that the use of Drone/Unmanned Aerial Vehicle (UAV) platforms are presently hindered by low endurance and minimal coverage capability; and despite a lack of development of sufficient safety standards in automation and air traffic control; and taking into account that rapid national and global deployment of capital, operational and logistical assets would be required to capture significant market share, all of which teach away from the instant invention. The instant inventors have constructed an aerial and a space-based Hyperspectral Imaging Sensor (HSI) sensor prototype with associated equipment. The aerial and space prototypes were, and are being, evaluated for commercial viability. The incentive for developing the prototype and for the belief in the success of the invention arises out of a synergy discovered from a use of a vegetative index for leak detection with aerial or space-based HSI coverage of Targets. Secondary effects of leaks or vegetation, including importantly of buried and submerged pipelines, provide speedy reliable detection techniques.

Note: Optical Gas Imaging (OGI) and Infrared cameras are becoming more common as sensors. However, these systems capture only one data point per pixel—temperature, whereas hyperspectral sensors capture hundreds of data points per pixel—uniquely enabling chemical classification and change detection.

Existing state-of-the-art hyperspectral sensor-based detection systems are commercially utilized for various market applications including precision agriculture, mining, oil and gas surveying, and defense. These systems have been implemented on satellite or aerial platforms (airplanes, helicopters, and drones) for these uses. Commercial utilization of hyperspectral sensor systems for monitoring oil, gas and chemical assets for leak detection is believed, however, to be limited to stationary platforms and ground vehicles. The perceived high costs, complexity of required systems and questions about accuracy and reliability have discouraged the use of aerial or space-based platforms for hyperspectral sensor systems for pipeline leak detection.

Patent application publication US 2015/0323449 generally recite the possibility of detecting gas leaks by utilizing hyperspectral sensors located on satellites or airplanes, without significant details or data or analysis methods or successful test results.

Patent application publication US 2018/0046910 discloses the development of sophisticated neuro-network learning machines to predict adverse conditions in regard to structural assets, based on vegetation. A key problem addressed is the impedance of utility lines by vegetation. Hyperspectral images and a vegetation index can be involved. No possibility of debating underground/undersea problems is discussed, nor is meeting tight regulatory time limits.

Patent application publication 2009/0271719 discloses the use of hyperspectral imaging and a vegetation index to display at a customer's request a vegetative index indicating vegetation health over a geographic area.

Patent U.S. Pat. No. 9,151,864 discloses ground monitoring and detecting of materials using hyperspectral imaging where the imaging sensors are ground-based from two fixed orthogonal locations.

SUMMARY OF THE INVENTION

The instant invention teaches that with on-board high-speed computing, reliable and high-capacity memory storage capacities, autonomous tasking schedules and low-cost/high-performance spectrometers, a feasible aerial or space-based solution is possible for pipeline leak detection, including of buried or submerged pipelines. In particular the unexpected accuracy and speed associated with the use of vegetative indices contributes to the success. Reliable timely results have been produced with the instant invention notwithstanding the necessity to correct images for atmospheric distortion and to take into account platform movement and to base conclusions on pixel data from different platforms, different passes and even from different sensors.

The term "platform" may be used herein loosely, as it is in the industry to refer to that structure to which the sensor is attached. This may include an aerial or space vehicle, along with the applicable mounting apparatus and/or cabinetry depending on the context.

The invention comprises an improved leak detection system for a Substance relating to a Target where the leak detection system includes an aerial or space-based platform with GPS and Attitude Determination and Control System (ADCS) capability. The platform is connected to a hyperspectral imaging sensor (HSI) and the system includes a processor and memory either on-board and/or on the ground, in communication with the GPS and ADCS and HSI sensor to produce geo-referenced pixels from sensor frame images. The improvement comprises a processor and memory supplied with a vegetation index such that a percent change within 7 days of the vegetation index over a threshold percent by a plurality of contiguous pixels related to a Target can trigger a reliable alert to investigate, at least at the Target. A preferred threshold percent is 25%. Preferably the vegetation index includes the Sims and Gamon Modified Normalized Difference Vegetation Index (mNDindex) or the Rondeaux et al. Optimized Soil-Adjusted Vegetation Index (OSAVI). Preferably the processor and memory is structured to analyze geo-referenced pixels using a substance detection technique based on pixel DN's and a selected wavelength. Preferably the substance detection technique includes the NASA hydrocarbon detection index. Preferably again the system HSI sensor has a weight of less than or equal to 10 kg and a volume of less than or equal to 16,000 $cm^3$. Preferably the Target includes buried or submerged pipelines.

Another aspect of the invention features, in some embodiments, a method of fulfilling monitoring frequency requirements, as per regulatory requirements, for both HVL and natural gas assets throughout the globe. The method includes monitoring for pipeline leaks using space-based platforms integrated with hyperspectral imaging (HSI) sensors.

In some embodiments, a Sun-Synchronous Orbit (SSO)/high-inclination constellation configuration of as few as five space-based sensor platforms may be required to fulfill monitoring frequency requirements, as per regulatory requirements, for both HVL and natural gas assets throughout the globe.

Another aspect of the invention features, in some embodiments, a method of detecting pipeline leaks. The method includes imaging a Target area with a hyperspectral imaging (HSI) sensor to generate a plurality of pixels representative of the Target area. The method includes extracting spectral signatures for each pixel in each Target area image based on ground-truthing measurements of hydrocarbon spectral signatures. The method includes correlating the spectral signatures to a respective spectral reference library using an endmember extraction algorithm, wherein the spectral signature corresponds to a ground-truthing measurement of hydrocarbon spectral signatures.

In some embodiments, the method includes monitoring the vegetation index for a Target area over time and triggering an alert to investigate when a change is detected within 7 days of the vegetation index over a threshold percent by a plurality of contiguous pixels related to a Target area.

In some embodiments, the endmember extraction algorithm is sequential maximum angle convex cone (SMACC) method.

In some embodiments, the endmember extraction algorithm is performed on-board a space-based sensor platform.

BRIEF DESCRIPTION OF DRAWINGS

The patent or application file contains at least one drawing executed in color. Copies of this patent or patent application publication with color drawing(s) will be provided by the Office upon request and payment of the necessary fee. Color drawings are necessary for a full understanding of the invention. Space-based imagery and spectral signatures from pixels in each image are best understood in the original color format. The grayscale renderings of these images are reproducible but do not convey the same depth of information and understanding as the color data imagery. This imagery and spectral indexes are material to practice and understanding of the invention.

A more complete understanding of the present aspects and advantages thereof may be acquired by referring to the following description taken in conjunction with the accompanying drawings, in which like reference numbers indicate like features.

Figure 1A:
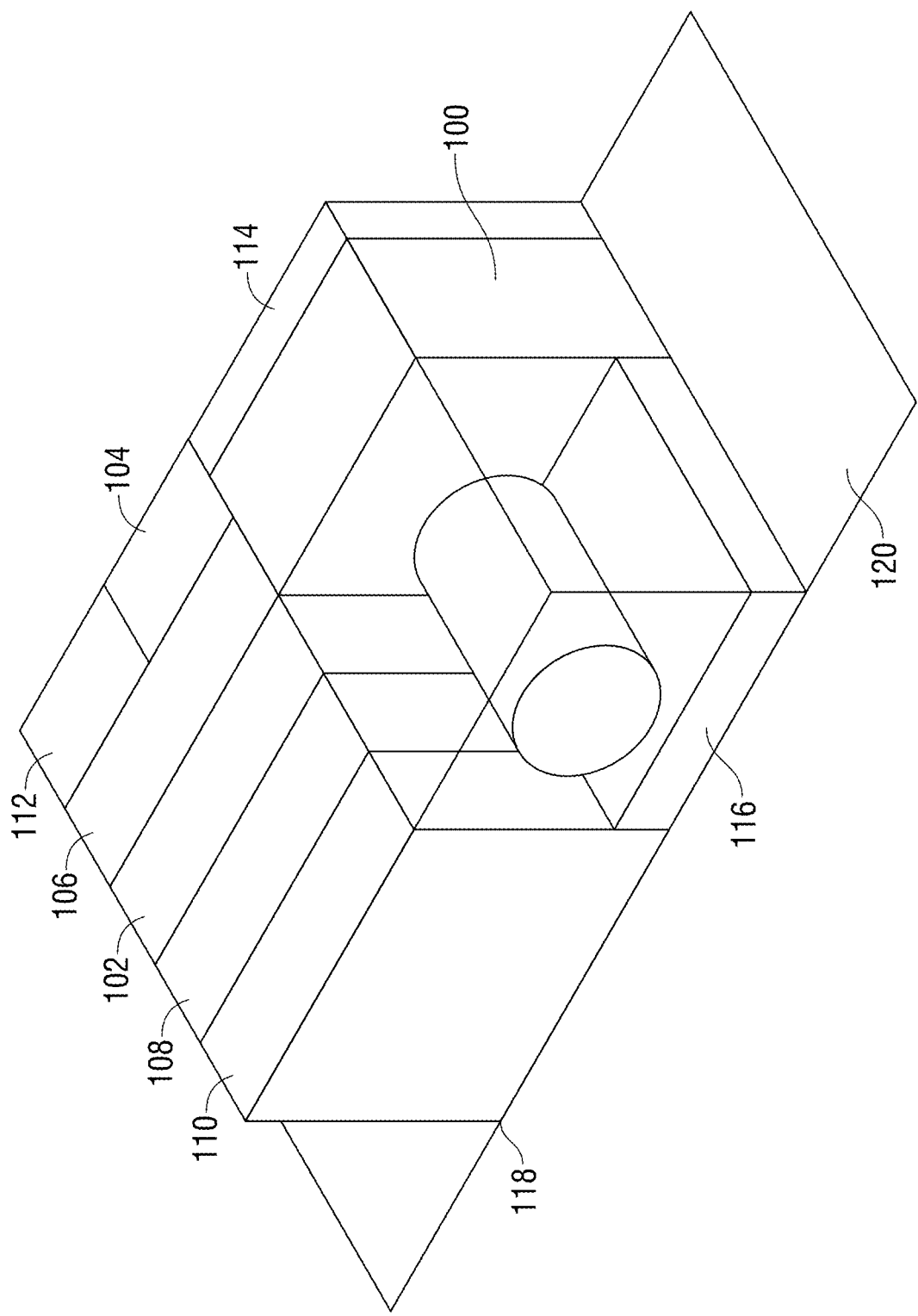
FIG. 1A is a depiction of a hyperspectral sensor and related equipment integrated into a platform suitable for space use.

The drawings are primarily illustrative. It would be understood that structure may have been simplified and details omitted in order to convey certain aspects of the invention. Scale may be sacrificed for clarity.

DETAILED DESCRIPTION

While aspects of this disclosure have been depicted and described and are defined by reference to exemplary aspects of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described aspects of this disclosure are examples of current deployments only, and not exhaustive of the scope of this disclosure.

The present disclosure relates, generally, to aerial- and space-based hyperspectral imaging of Targets for detecting leaks (or no-leaks) of Substances, and more particularly to apparatus and methods of validation of Target infrastructure integrity using a vegetative index. The invention relates to imaging and characterizing hydrocarbon leaks in refineries, terminals and transmission/gathering/distribution pipelines, including buried and submerged pipeline, based at least in part on a vegetative index.

Hyperspectral imaging, for the purposes of this disclosure, refers to the process in which an imaging spectrometer sensor captures digital count values (DN) for pixels of dozens, if not hundreds, of narrow contiguous electromagnetic wavelength sets ($\Delta\lambda$'s) including in particular for the disclosed purposes in the visible and infrared electromagnetic spectra. For those of ordinary skill in the art of hyperspectral image capturing and analysis, the general principles behind the operation of a hyperspectral sensor system are understood and thus are not further disclosed in detail.

In some embodiments of the invention, a hyperspectral sensor is integrated into a space-based platform deployed in a Low Earth Orbit (approximately 250 to 1000 km altitude and 0 to 100 degrees inclination.) Any Earth orbiting configuration is possible. Possible space platforms include existing platforms such as the International Space Station (hereafter referred to as ISS), dedicated satellites and/or a payload host of a generic nature. Tasking schedules for the sensor onboard the space platform is preferably predicated upon GPS locations of both the space platform and a repository of GPS locations for customer assets on the ground (Targets).

Selection of specific wavelengths and vegetative indices pertaining to the monitoring of specific customer assets (e.g. applicable to specific Targets and Substances) enhances the speed and reliability of decisions.

Note that the capture of sufficient wavelength DN's for a particular customer asset or Target may be acquired over the course of multiple passes, or orbits, and may be acquired by multiple sensors on multiple platforms.

Sensor images, or frames, are divided into pixels and related equipment geo-references the pixels, as is known in the art. A pixel, as is known in the industry, is a physical characteristic of the sensor's focal plane array (FPA) and of the frames or images of a hyperspectral sensor. Reflected photons are registered for sensor pixels as Digital Count Values (DN's), the value reflecting photons per pixel per exposure time. (A "frame" or image is the exposure of the FPA to light photons for a single exposure time.) DN values of contiguous (side by side or overlapping or at least separated by no more than a pixel diameter) pixels, related by their geo-references to Targets, are analyzed. Such analysis may be performed either on-board a space platform or during post processing at analytics workstations on the ground (see FIG. 6). Efficient capturing of Target related DN values is provided by selected platform orbits and tasking schedules for the hyperspectral sensors. By coordinating sensor platform orbits in a Sun-Synchronous Orbit (SSO)/ high-inclination constellation configuration, only five sensor platforms may be required to fulfill monitoring frequency requirements, as per regulatory requirements, for both HVL and natural gas assets, (see FIG. 5) throughout the globe.

Again, Target related pixels, with associated DN values, are tagged with GPS coordinates for geo-rectification. Preferably utilizing a line-scan imaging spectrometer, specific preferred wavelength selection can be further performed, either on the front end with active selection of specific wavelengths or on the back end during on-board data processing, memory storage and compression. Wavelength selection can be a function of GPS location and of asset monitoring requirements.

Various forms of imaging spectrometers may be utilized in addition to line-scan imaging. These include, but are not limited to, spectral and spatiospectral scanning systems. An autonomous tasking schedule for specific wavelength capture can be enabled by a high-speed on-board processing capability. Usage of high-performance commercial components in a small volume/low mass space platform lends itself to reduced cost and reduced launch schedule risks, thereby facilitating the deployment and operation of a constellation of space-based sensor systems. These referenced commercial components are space qualified and can be integrated into a confined volume for space applications.

Analysis of space-based hyperspectral geo-referenced pixels and DN's preferably includes applying atmospheric corrections to the frames or pixels. Atmospheric corrections are presently collected from the same space platform as the hyperspectral sensor. However, these additional atmospheric sensors contribute to the overall mass and volume of the space platform, thereby increasing hardware and launch costs. In a preferred aspect of the invention, atmospheric corrections are aggregated from existing Open Source atmospheric sensor data, thereby eliminating a need for a redundant system on the hyperspectral sensor space platform.

Methods for disseminating data to ground stations are known to those of ordinary skill in the art of space-based communication systems and is not disclosed in detail.

Digital count values (DN's) for each pixel are preferably analyzed autonomously and may be converted to a unique spectral signature (see FIG. 5B), which may then be matched or compared to a stored spectral library.

A vegetative reflectance index is a spectral transformation of two or more bands designed to enhance the contribution of vegetation properties and allow reliable spatial and temporal inter-comparisons of terrestrial photosynthetic activity and canopy structural variations. The instant inventors have particularly and unexpectedly discovered that a computation of a vegetative reflectance index, which includes but is not limited to, the Sims and Gamon Modified Normalized Difference Vegetation Index (mNDindex) and the Rondeaux et al. Optimized Soil-Adjusted Vegetation Index (OSAVI) (formulas specified below) can be effectively utilized, especially in regard to weekly change, to identify an anomalous region of interest and create a leak alert to investigate. Additional vegetative indexes that are optimized for use with HSI sensors include Discrete-Band Normalized Difference Vegetation Index, Yellowness Index, Photochemical Reflectance Index, Discrete-Band Normalized Difference Water Index, Red Edge Position Determination, and Crop Chlorophyll Content Prediction.

A high-fidelity spectral reference library may also be utilized to perform material classification and hydrocarbon product speciation. Open source reference libraries can be combined with unique spectral reflectance profiles of specific customer products including, but not limited to, hydrocarbons and chemicals, to form a sensitive reference for background.

Validation and verification testing of various aspects of the instant invention were performed in 2018 and continue to be performed in 2019. A prototype version of a hyperspectral sensor system was deployed in 2018 to capture data on-board the International Space Station. This space-based data is correlated to aerial and ground-based data for ground-truthing purposes.

A process of performing field measurements and ground-truthing exercises is helpful for an accurate analysis of hyperspectral pixel information and Target images, as known to those of ordinary skill in the art of terrestrial-based hyperspectral imaging and analysis. The aspect of correlating terrestrial field measurements and ground-truthing to space-based hyperspectral imaging for the purposes of hydrocarbon and chemical industry regulatory compliance and hydrocarbon and chemical infrastructure integrity validation, leak detection and product speciation is believed unique to this invention and new to the field.

Correlation of terrestrial measurements with space-based hyperspectral imaging from the International Space Station in 2018 and 2019 allows for the identification of unique spectral bands for high-fidelity analysis, significantly reducing data capture requirement on space platforms. The reduction in the data capture requirements results in significantly lower costs for the space-based hyperspectral sensor system.

In one exemplary aerial-implemented test, for Highly Volatile Liquid (HVL) pipeline regulatory compliance, monitoring hyperspectral data collection and applying a vegetative index analysis proved to be sufficient to meet the requirements for each segment of pipeline (e.g., no less than every two weeks for compliance with 49 CFR 192 and 195), including buried and submerged pipeline.

Taking into account specific orbit altitude, incident sun angle, and cloud cover also can affect a tasking schedule of a hyperspectral sensor for capturing high-fidelity data sets for analysis and subsequent compliance reporting. Preferably tasking schedules are performed autonomously on-board a space platform.

In exemplary aspects for space-based Natural Gas pipeline regulatory compliance monitoring, the frequency of hyperspectral data set collection can vary depending on the specific compliance requirements. As with a prior exemplary test, specific orbital and environmental conditions are preferably adhered to in order to obtain the necessary data to meet regulatory compliance obligations. All of the above is preferably performed autonomously on-board a space platform.

Further aspects of the invention include space-based energy infrastructure monitoring in more general terms where energy infrastructure assets may include, but are not limited to, pipelines, refineries, terminals, tankers, oil rigs, tank cars, and fracking sites.

In a further aspect of the invention, a hyperspectral sensor is integrated into an aerial platform such as an airplane, helicopter or drone (UAV) and flown over energy infrastructure assets.

The above aspects of the invention enable the following monitoring services to be provided:

1. Compliance per 49 CFR Parts § 192 and § 195 (DOT-PHMSA);
2. Direct and early oil & gas vapor leak detection for the oil, gas and chemical industries;
3. Indirect leak detection via dead vegetation or sheen or bubbles on the water;
4. Product and plume speciation/characterization;
5. Right-of-way (ROW) monitoring for encroachments, unauthorized ROW activities and
6. third-party damage prevention;
7. Land spill tracking;
8. Ocean/waterway spill tracking;
9. Topography monitoring for pipeline exposures (washouts, unsupported spans and landslides);
10. Post natural disaster inspections such as floods, hurricanes, and tornadoes noting facility asset and pipeline movement, damage or exposures; and
11. Change detection over time for all of the above, including archiving and comparing prior data sets.

ANALYSIS AND TESTING

A vegetative reflectance index is a spectral transformation of two or more bands designed to enhance the contribution of vegetation properties and allow reliable spatial and temporal inter-comparisons of terrestrial photosynthetic activity and canopy structural variations. The instant inventors have particularly and unexpectedly discovered that a computation of a vegetative reflectance index, which includes but is not limited to, the Sims and Gamon Modified Normalized Difference Vegetation Index (mNDindex) and the Rondeaux et al. Optimized Soil-Adjusted Vegetation Index (OSAVI) (formulas specified below) can be effectively utilized, especially in regard to weekly change, to identify an anomalous region of interest and create a leak alert to investigate. Additional vegetative indexes that are optimized for use with HSI sensors include Discrete-Band Normalized Difference Vegetation Index, Yellowness Index, Photochemical Reflectance Index, Discrete-Band Normalized Difference Water Index, Red Edge Position Determination, and Crop Chlorophyll Content Prediction.

Analysis of Target images may comprise of the application of specific algorithms to each data pixel. In the following formulas, pi refers to the DN value for each pixel at a specific wavelength value, i. A combination of various reflectance indices that include, but are not limited to, the Sims and Gamon Modified Normalized Difference Vegetation Index (mNDindex):

$$mNDindex = \frac{\rho 750 - \rho 705}{\rho 750 + \rho 705 - 2*\rho 445};$$

the Rondeaux et al. Optimized Soil-Adjusted Vegetation Index (OSAVI):

$$OSAVI = (1 + 0.16)\frac{\rho 800 - \rho 670}{\rho 800 + \rho 670 + 0.16};$$

and the NASA Hydrocarbon Detection Index (HDI):

$$HDI = \frac{\rho 2297 - \rho 2329}{2 * \rho 2313}$$

may be utilized to identify a leak and/or a no leak condition with respect to a Target and a Substance. While the HDI is an effective tool for directly detecting hydrocarbons in direct view of the HSI sensor (and therefore limited to above-ground pipelines or gross leaks from buried and submerged pipelines), vegetative indexes (i.e., mNDindex and OSAVI) are effective in identifying buried pipeline leak conditions at an early stage prior to the hydrocarbon or chemical presenting itself at the surface. Higher mNDindex and OSAVI values indicate more healthy vegetation and regions less likely to have been contaminated with hydrocarbons and/or other chemicals. Normalized valid results fall between −1 and +1 and are visualized on a rainbow color scale (blue-to-red) on the analyzed Target image.

Furthermore, these indices are effective for determining changes in vegetative health as a function of time. The use of space platforms to perform daily monitoring of Target areas enables numerous change detection analyses for regulatory compliance purposes such as, but not limited to, simple difference and percent difference for result values. Since the change detection algorithms are ingesting result values from vegetative indexes, which are ratios of pixel values, pre-processing of pixel values (such as normalization or standardization) is not needed and thus significantly reduces computational processing time. Experiment and testing data indicate that a percent change within 7 days of the vegetation index over a threshold percent (≥25%) by a plurality of contiguous pixels related to a Target represents underlying anomalies to the right-of-way due to the presence of hydrocarbons and/or chemicals. In exemplary aspects, this change detection triggers an alert to investigate a leak at the Target.

Pixel data for a set or range of wavelengths may be compared to spectral reference library data. A high-fidelity spectral reference library may be additionally utilized to perform material classification and hydrocarbon product speciation. Open source reference libraries can be combined with unique spectral reflectance profiles of specific customer products including, but not limited to, hydrocarbons and chemicals, to form a sensitive reference for background. Furthermore, spectral reflectance profiles of manmade objects such as, but not limited to, construction equipment, vehicles, and other manmade intrusions along the right-of-way may be identified to aid in regulatory compliance services during weekly monitoring activities via HSI sensor on aerial and space platforms.

DETAILED DESCRIPTION OF FIGURES

FIG. 1A is a depiction of a preferred space-based hyperspectral sensor and platform and related equipment. The sensor may include a commercial-off-the-shelf (COTS) Hyperspectral Imaging Sensor 100. Preferably a fast, power-efficient embedded Artificial Intelligence (AI) computing device is included with the on-board equipment which in the preferred embodiment is indicated as a modular central processing unit (CPU) 102, such as the ODROID XU4. A space-qualified attitude determination & control subsystem (ADCS) for Target acquisition/pointing capabilities and propulsive maneuvering 104 is preferably included, such as the XACT model from Blue Canyon Technologies. An electrical power subsystem (EPS) 106 preferably provides conditioned power to all spacecraft and payload subsystems and components via a single power bus, with power generated via solar arrays and stored via batteries, such as those supplied by Blue Canyon Technologies. A large capacity (greater than 1 terabyte) COTS memory storage device 108, such as a Samsung 850 Evo SSD is preferably provided. A high throughput communication device 110, such as Clyde Space's CPUT X-band transmitter, for downlinking HSI image data from Low Earth Orbit to terrestrial ground stations is preferably provided. An electric propulsion system that contains propellant sufficient for station keeping and de-orbit maneuvering 112, such as the IFM Nano Thruster from Enpulsion, is preferably provided. A global positioning system (GPS) antenna 114 and GPS receiver 116, such as the GPSRM 1 from Pumpkin Space, is preferably provided. A structure 118 surrounding an on-board sensor system is preferably sufficiently thick to provide radiation protection to the internal components. The on-board sensor system may include deployable solar arrays 120.

Figure 1B:
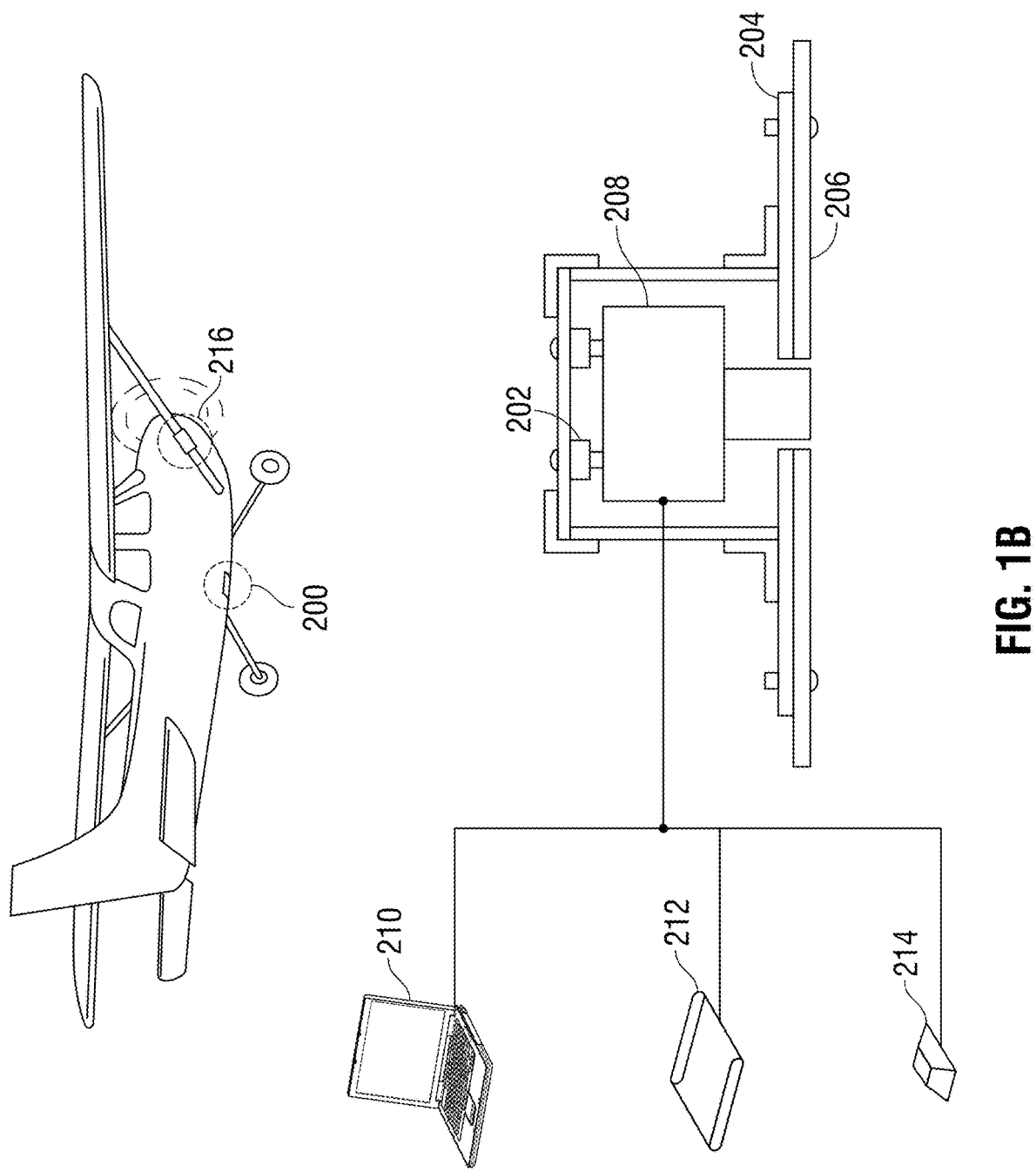
FIG. 1B is a depiction of a hyperspectral sensor and related equipment mounted in the tail section of an aircraft platform.

FIG. 1B illustrates an aerial-based hyperspectral sensor mounted in a tail section of a Cessna aircraft 200 platform. The mounting configuration may include vibration dampening mounts 202, aluminum (AL) plates 204 which are bolted to the skin of the aircraft 206, and a COTS hyperspectral sensor 208. The operational architecture of the hyperspectral sensor and related equipment may contain a laptop 210, a portable power supply 212, a GPS antenna 214, and a hyperspectral sensor 208. A secondary mounting location for the equipment system may be located on the wing strut 216.

Figure 2A:
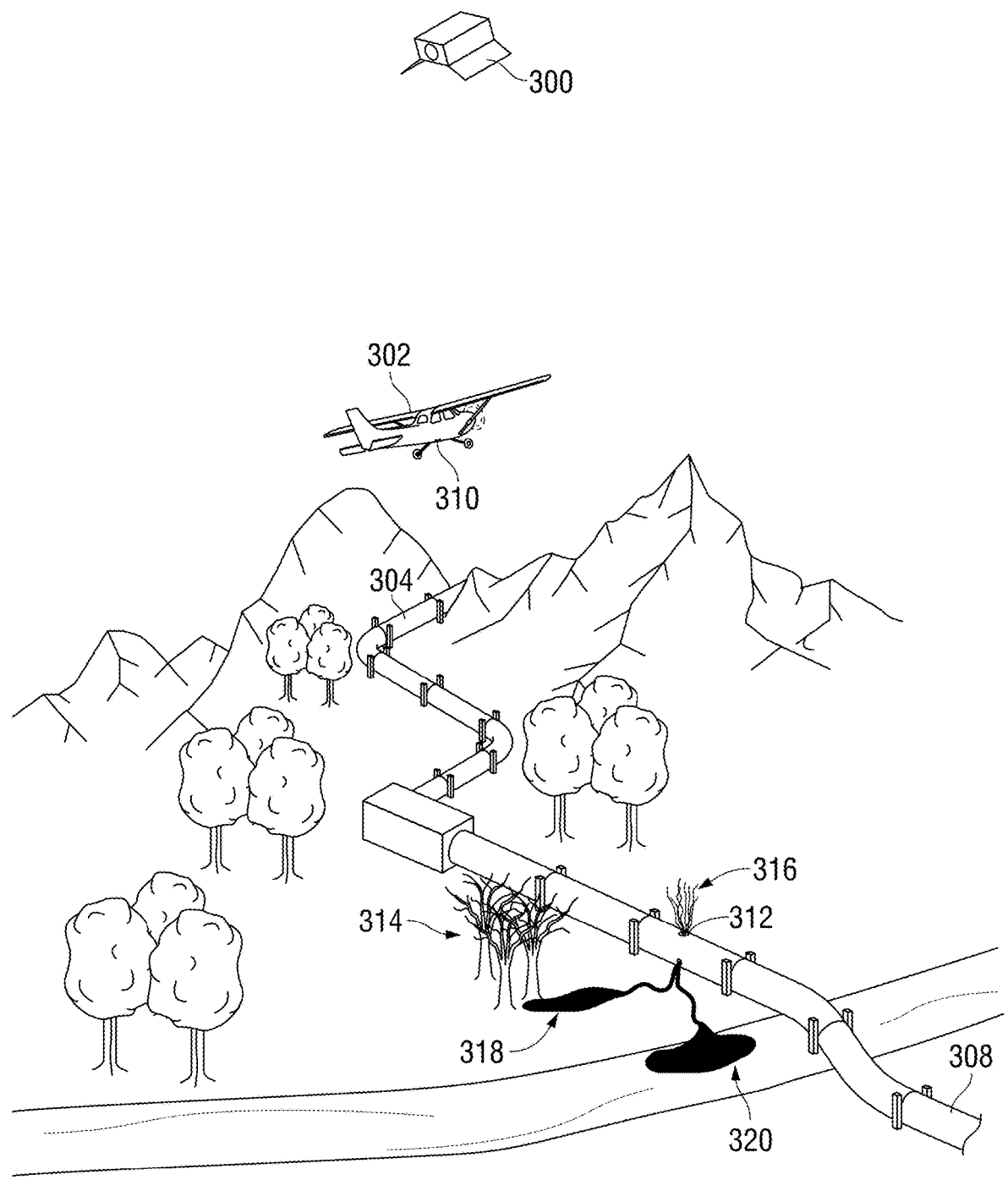
FIG. 2A shows space-based and aerial-based hyperspectral sensors and platforms capturing data according to orbital parameters and corresponding GPS locations of both the platforms and the monitored ground Targets.

FIG. 2A illustrates space-based 300 and aerial-based 302, 310 hyperspectral sensor platforms capturing hyperspectral images according to specific orbital parameters and corresponding GPS location of both the space/aerial platforms and the monitored ground Targets, which with the instant invention and use of vegetative indices, may include above-ground 304, buried 306, and submerged pipelines 308. The HSI sensor with the inventive analysis can be utilized to detect an unknown leak source in the pipeline, which may present itself: as a change in soil reflectance properties due to a hydrocarbon or chemical leak 312, as shown in FIG. 2B; dead vegetation and trees due to a hydrocarbon or chemical leak 314; hydrocarbon vapors disseminating from a pipeline leak 316; pooling of liquid hydrocarbons or chemicals 318; and/or oil or oil product slicks 320.

Figure 2B:
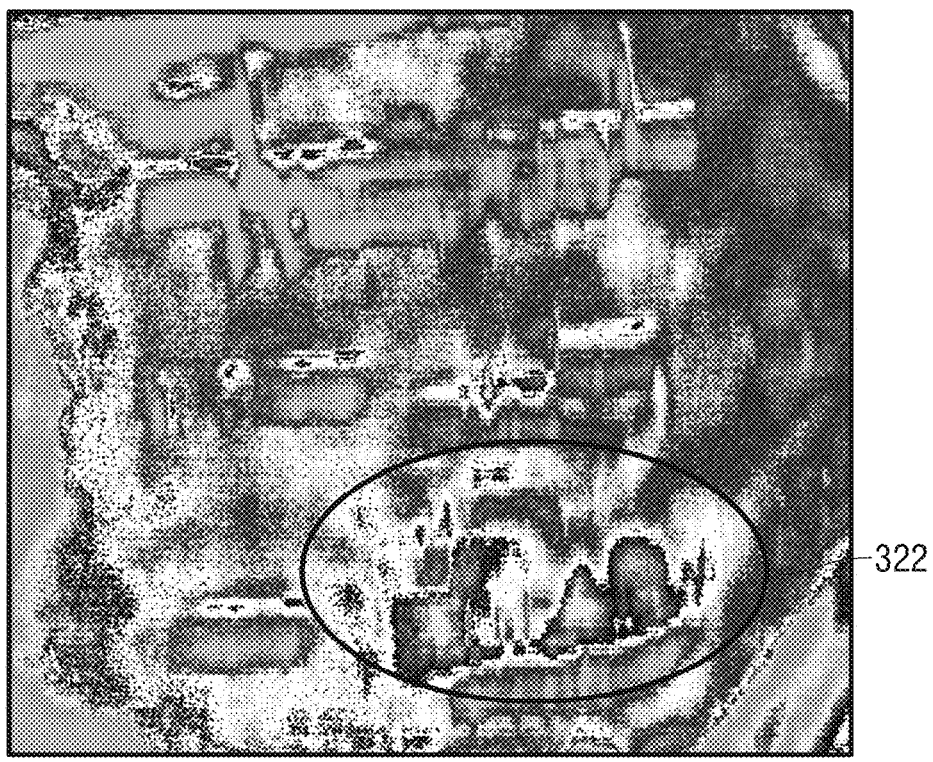
FIG. 2B depicts, visually, results of a successful testing example of an underground natural gas pipeline leak detected utilizing an aerial hyperspectral sensor and applying a vegetative index in anomaly detection formulas.

FIG. 2B presents a "visual" image of a testing example of a leak detection of an underground natural gas pipeline utilizing an aerial hyperspectral sensor and analyzed using vegetative anomaly detection indices, specifically the Sims and Gamon Modified Normalized Difference Vegetation Index (mNDindex) and the Rondeaux et al. Optimized Soil-Adjusted Vegetation Index (OSAVI). An underground natural gas leak was successfully detected using the inventive analysis, shown captured in the circled region on the bottom of the visual image 322.

Figure 2C:
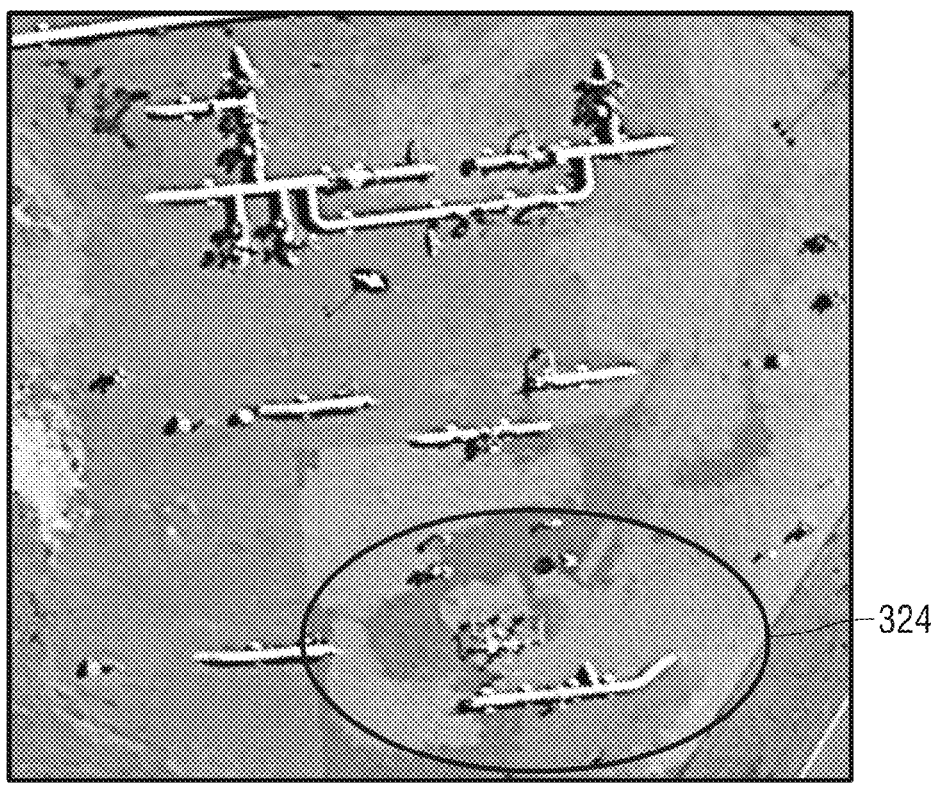
FIG. 2C shows a true color photograph of the natural gas pipeline manifold depicted in FIG. 2B.

FIG. 2C presents a true color image of the natural gas pipeline manifold presented in FIG. 2B. An underground natural gas leak was successfully detected using the inventive analysis; however, there is no indication of the leak in the area captured in the circled region on the bottom of the true color image 324.

Figure 3A:
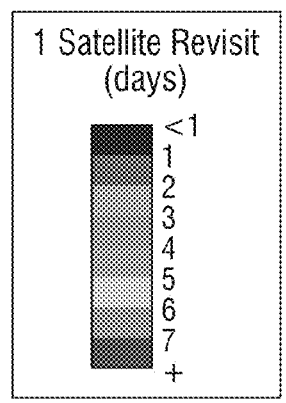
FIG. 3A shows a three-dimensional ground track of a space-based hyperspectral sensor and platform in a Sun synchronous orbit (SSO) over a period of 7 days, with an inclination of approximately 97.8 degrees and an altitude of approximately 500 km.
Figure 3A:
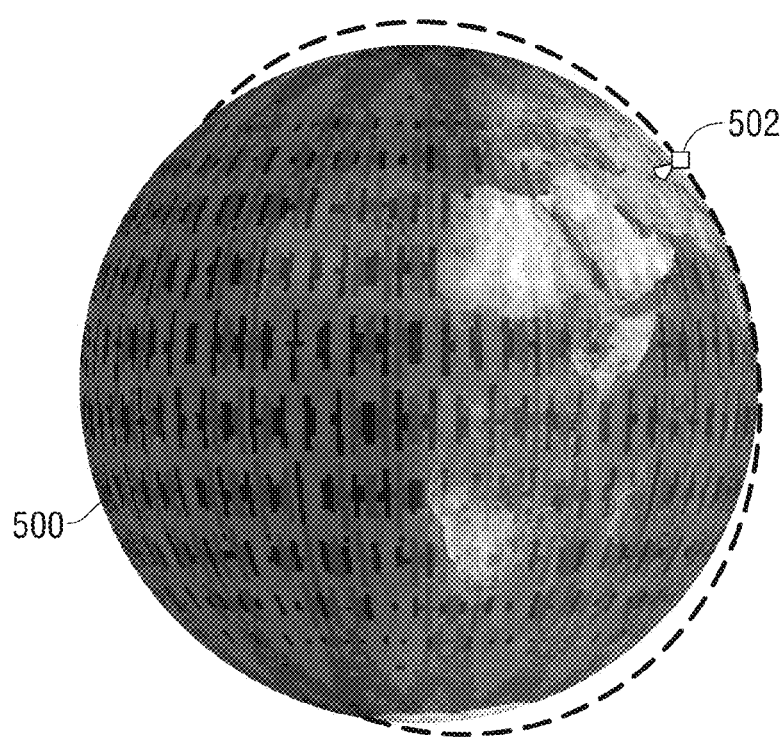

FIG. 3A shows a three-dimensional ground track 500 of a space-based hyperspectral sensor platform in a Sun synchronous orbit (SSO) 502 over a period of 7 days, where the orbital parameters are defined as having an inclination of approximately 97.8 degrees and an altitude of approximately 500 km. The swath width of the sensor in this orbital configuration, including orthogonal pointing capability equivalent to 15 degrees off-nadir, is approximately 250 km. The ground speed of the sensor platform is approximately 7.1 km/s, and the frequency of imaging is approximately 706 Hz.

Figure 3B:
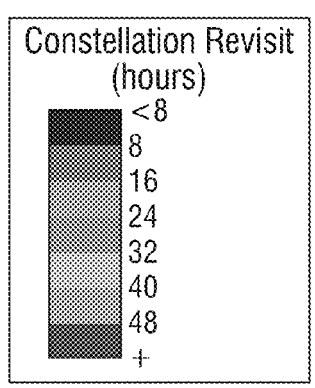
FIG. 3B shows a three-dimensional ground track of the space-based hyperspectral sensor and platform constellation over a period of 48 hours, which includes 5 space platforms in Sun synchronous orbit for maximum daily coverage of customer Targets globally.
Figure 3B:
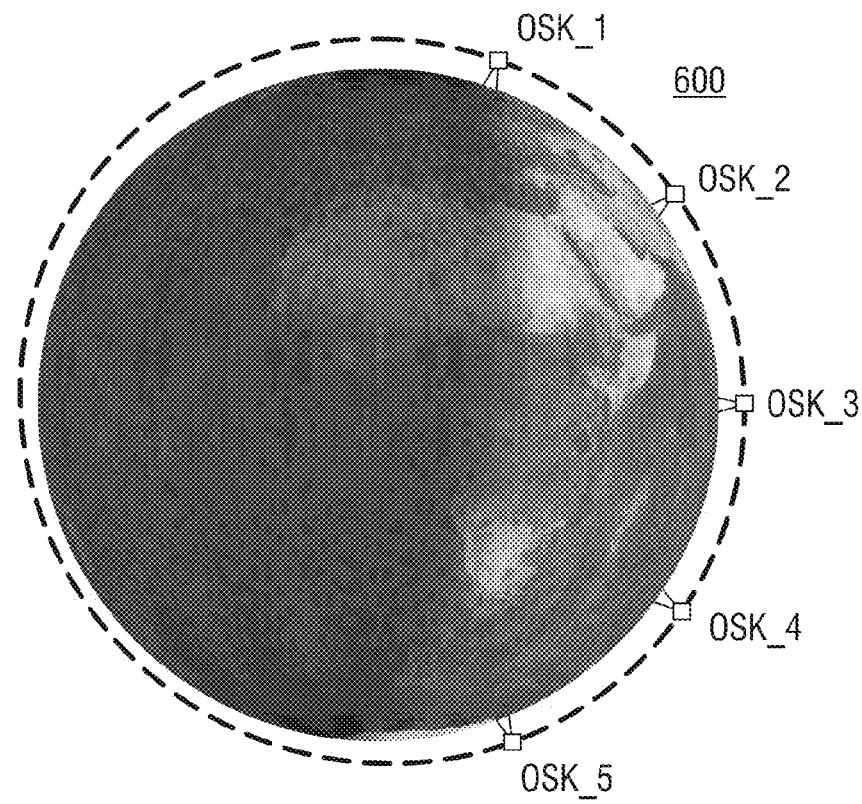

FIG. 3B shows a three-dimensional ground track of a space-based hyperspectral sensor platform constellation over a period of 48 hours, which includes 5 space platforms 600 (labeled OSK_1, OSK_2, OSK_3, OSK_4, OSK_5) in Sun synchronous orbits, which may be referred to as a Constellation, for maximum coverage of Targets globally. The 5 space platforms in Sun synchronous orbits are separated by an orbit epoch of 9.2 minutes and each has a local time of descending node of 10:30 am. This orbital configuration of space systems allows for maximum global Target coverage over a period of 1 day.

Figure 4A:
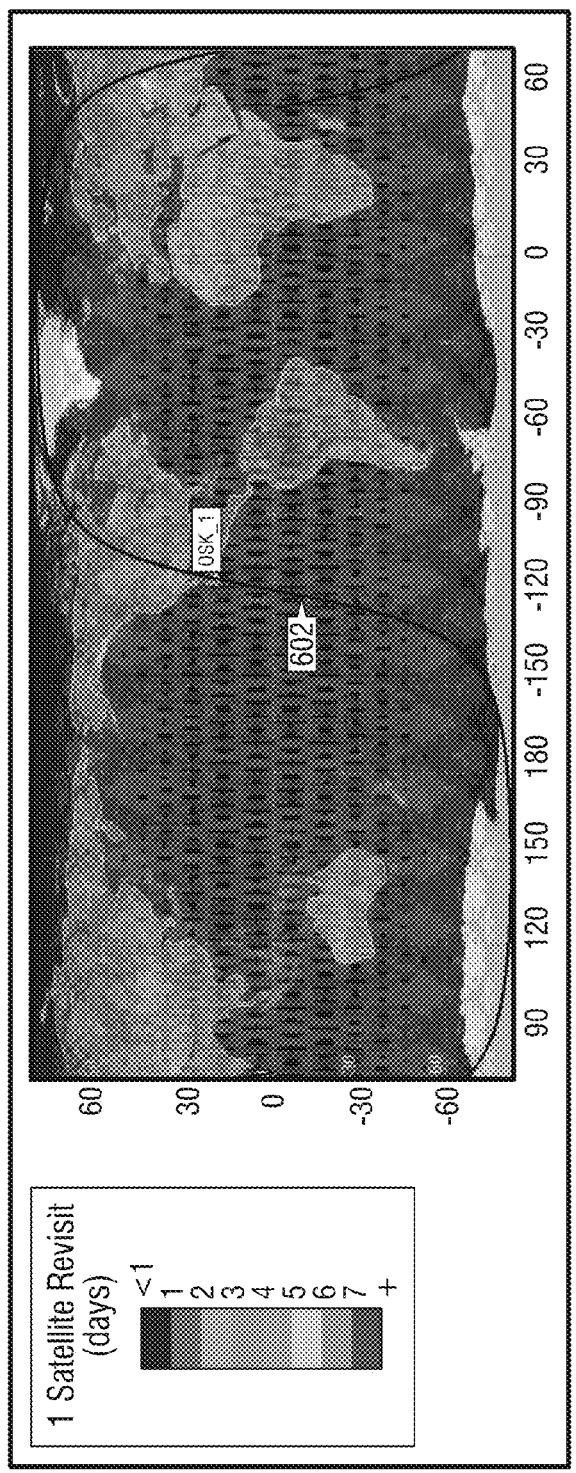
FIG. 4A shows a two-dimensional projection of the space-based hyperspectral sensor platform ground track shown in FIG. 3A.

FIG. 4A shows a two-dimensional projection of the space-based hyperspectral sensor platform ground track shown in FIG. 3A.

Figure 4B:
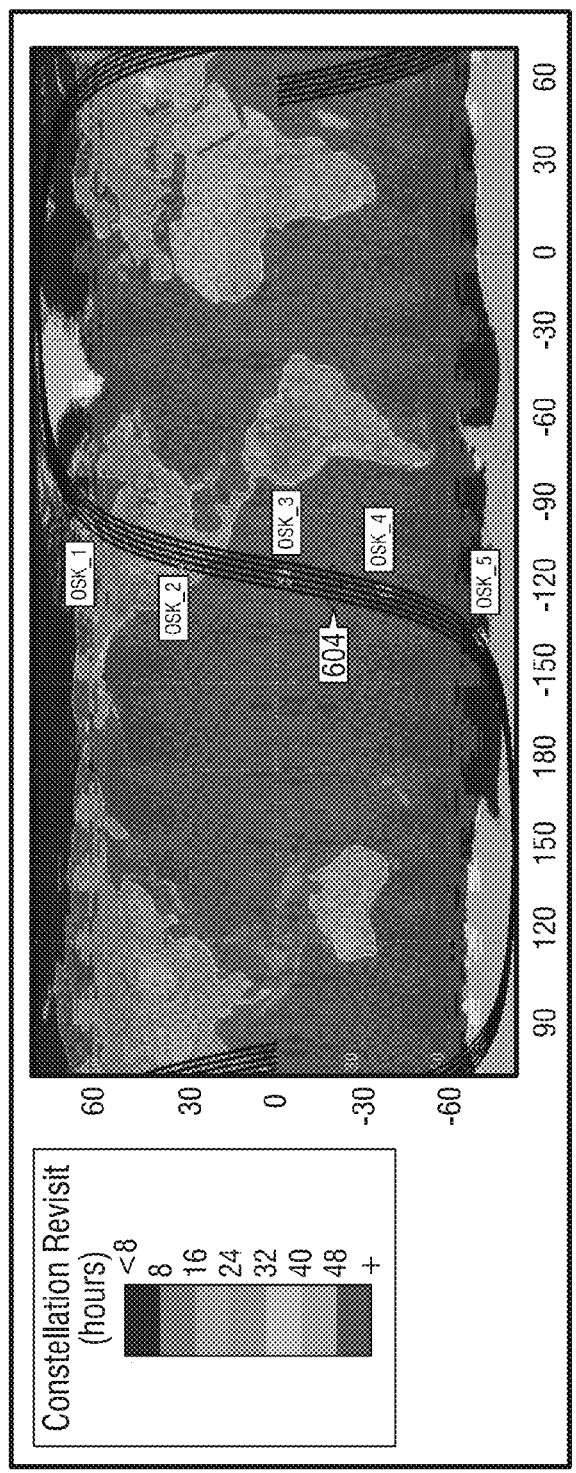
FIG. 4B shows a two-dimensional projection of the space-based hyperspectral sensor platform ground tracks shown in FIG. 3B.

FIG. 4B shows a two-dimensional projection of the space-based hyperspectral sensor platform ground tracks shown in FIG. 3B.

Figure 5A:
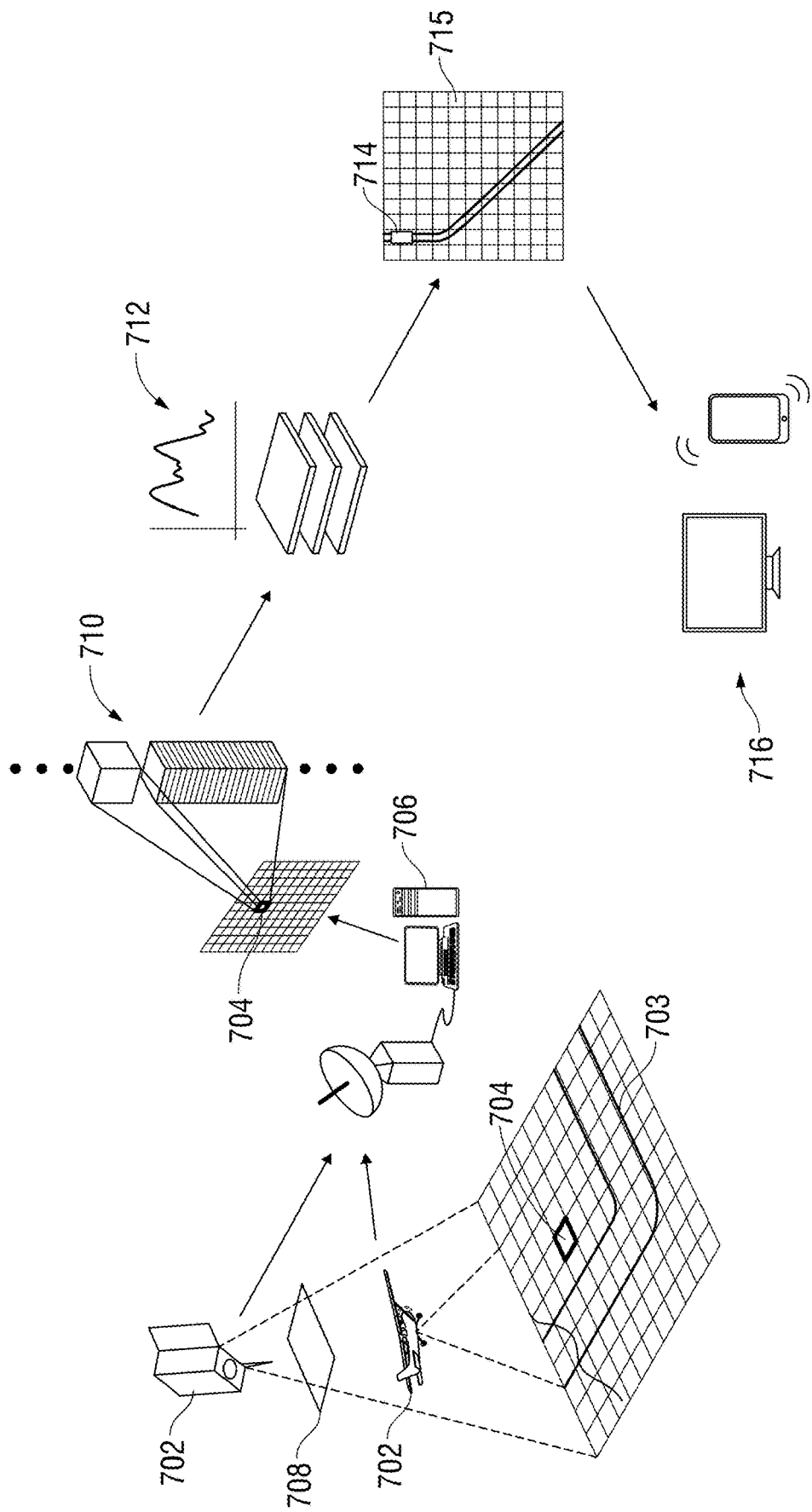
FIG. 5A illustrates a hyperspectral information delivery architecture, which includes the capturing of hyperspectral data (image data) from aerial and space platforms, analysis of the data, and integration of the data into industry standard database architectures.

FIG. 5A depicts a hyperspectral information delivery architecture. HSI sensor images (see FIG. 6 for a portion of an image) are illustrated captured with aerial-based and/or space-based platforms 702, where the relative direction of motion of the aerial and space platform is inconsequential to a resulting mosaicking of contiguous or overlapping pixels 704, from frames or images. A coordinate grid 703 is projected over a Target area, and the application of GPS coordinates to pixels can result in georeferenced sensor images assigned to the coordinate grid. FIG. 5A also illustrates the transfer of geo-referenceable sensor images or pixels, with their DN values through communication links 706 after flyover. Atmospheric correction of geo-referenceable sensor images is preferably performed, to account for atmospheric distortion preferably using Open Source data. Parsing, geographically and wavelength-wise, is also preferably performed on the HSI image data and mosaicking of contiguous or overlapping image data/pixels including parsed and atmospherically corrected pixels, to form one or more "target images" 710 is indicated. Georeferenced sensor images with related latitude and longitude coordinates are combined with algorithms to analyze data, a process which is known in general to those of ordinary skill in the art. Analysis of "Target images" may comprise the application of specific algorithms to each data pixel. The instant invention teaches a combination of at least one vegetative reflectance index. Preferably the vegetative index includes, but is not limited to, the Sims and Gamon Modified Normalized Difference Vegetation Index (mNDindex):

$$mNDindex = \frac{\rho 750 - \rho 705}{\rho 750 + \rho 705 - 2*\rho 445};$$

and the Rondeaux et al. Optimized Soil-Adjusted Vegetation Index (OSAVI):

$$OSAVI = (1 + 0.16)\frac{\rho 800 - \rho 670}{\rho 800 + \rho 670 + 0.16}.$$

The NASA Hydrocarbon Detection Index (HDI):

$$HDI = \frac{\rho 2297 - \rho 2329}{2*\rho 2313}$$

is a further useful analysis tool.

All three indices may be utilized to identify a leak (and/or a no leak condition) with respect to a Target and a Substance. In general higher mNDindex and OSAVI values indicate more healthy vegetation and regions less likely to have been contaminated with hydrocarbons and/or other chemicals. Normalized valid results fall between −1 and +1 and are visualized on a rainbow color scale (blue-to-red) on the analyzed Target image. Pixel data for a set or range of wavelengths (FIG. 5B, 718) may be compared to library data, as may spectral signatures. In the above formulas pi refers to the DN value for each pixel at a specific wavelength value, i. The analyzed Target images may be ingested into a map-based display program such as Google Maps or ArcGIS that overlays the Target images 714 on historical satellite imagery 715 and facilitates visualization of anomalous conditions and is compatible with industry standard database architectures 716, where the frequency of delivery, alerts and information content is dependent on individual operators. Reporting may include: confidence of change detected in region of interest; latitude/longitude as well as mile marker information; product speciation around region of interest; change in vegetation density/health; and third-party activity and foreign object detection.

Figure 5B:
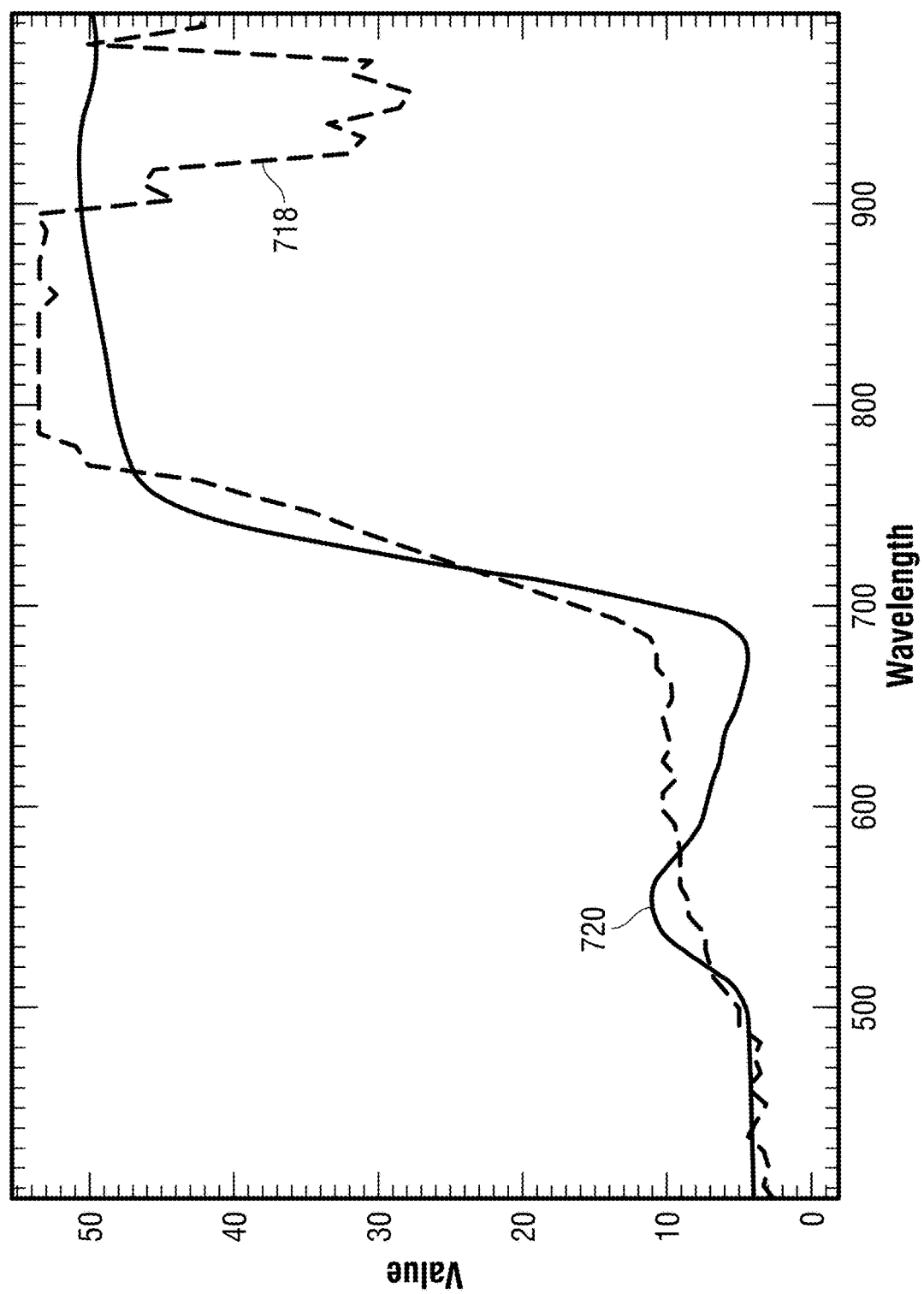
FIG. 5B shows an example of an analysis technique for leak conditions including extracting spectral signatures from pixels in each image and illustrates a possibility of correlating the signature to a spectral reference library.

FIG. 5B shows an example of further analysis of a leak condition comprising extracting spectral signatures 718 for each pixel in each Target image and correlating to a respective spectral reference library using, in the case of the preferred embodiment, an endmember extraction algorithm such as the sequential maximum angle convex cone (SMACC) method 720, which is known to those of ordinary skill in the art.

Figure 6:
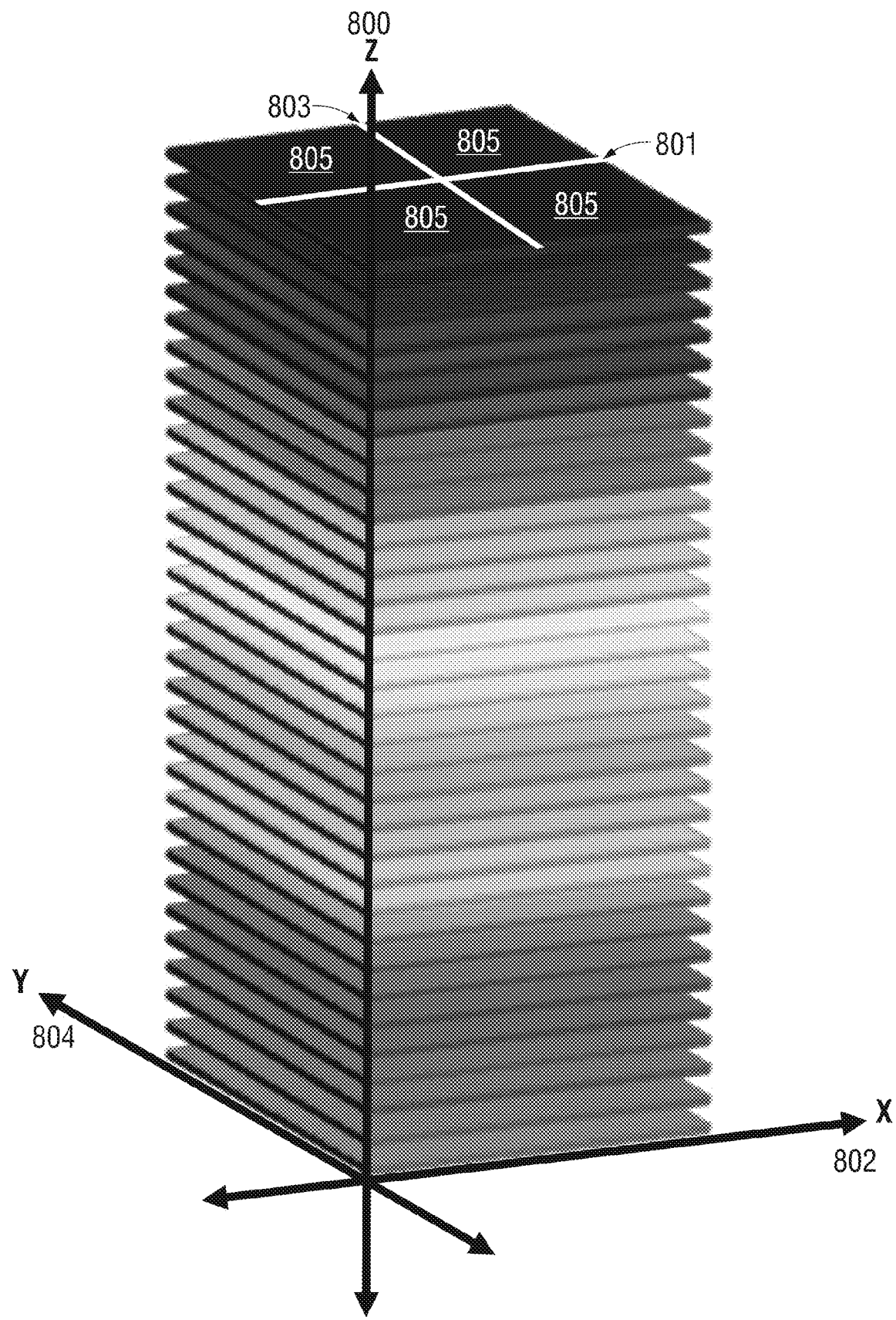
FIG. 6 illustrates geo-referencing of hyperspectral data. Individual pixel columns (along the z-axis) are assigned a latitude and longitude coordinate (along the x and y-axes) in metafiles for each data capture event.

FIG. 6 illustrates a geo-referencing or GPS tagging for hyperspectral datasets where FIG. 6 shows a portion of a hyperspectral image, the pixels extending in the X and Y directions, and the drawing showing four segments. For each pixel, defined by the FPA of the hyperspectral sensor as a certain AX 801 and AY 803 in the image, there will be one Z value recorded for each AZ range of a Ak sensed. Individual pixel columns (along the z-axis 800 for a given (x,y)) are assigned a latitude and longitude coordinate along the 2-dimensional plane formed by the x-axis 802 and y-axis 804 in the metafiles for each HSI sensor image capture event. The georeferenced sensor image pixels 805 with related latitude and longitude coordinates are combined and contiguous pixels mosaicked to create a mosaicked georeferenced sensor image over a Target scene. A grid (FIG. 5A, 703) over a Target area has a centered GPS coordinate for each grid point, and each pixel is then assigned according to how close it is to the grid point.

There are 2 methods for the creation of a 2D presentation image. The first method involves combining three pixel values of discrete Δλ's in the Z-axis which correspond to Red-Green-Blue (RGB) assignments. The second method involves applying a specific algorithm, such as the mND-index, OSAVI, or HDI, to each discrete pixel to generate a single normalized valid result, which may fall between −1 and +1, and are visualized on a rainbow color scale (blue-to-red) on the analyzed Target image.

What is claimed is:

1. An improved leak detection system for a Substance relating to a Target, the leak detection system including an aerial- or space-based platform with GPS and ADCS capability, the platform connected to a HSI sensor, and in communication with a processor and memory structured to produce geo-referenced pixels from sensor frame images, the improvement comprising:
   the processor and memory configured to monitor vegetation index data for a plurality of Targets within a right-of-way over time such that detection of a percent change of vegetation index within 7 days within the right-of-way over a threshold percent over a plurality of contiguous pixels related to one or more of the plurality of Targets triggers an alert to investigate a leak of the Substance at the respective Target.

2. The system of claim 1 wherein the threshold percent is 25%.

3. The system of claim 2, wherein the vegetation index includes the Sims and Gamon Modified Normalized Difference Vegetation Index (mNDindex) or the Rondeaux et al. Optimized Soil-Adjusted Vegetation Index (OSAVI).

4. The system of claim 3 wherein the Substance detection technique includes the NASA Hydrocarbon Detection Index.

5. The system of claim 1 wherein the processor and memory are configured to analyze geo-referenced pixels associated with a related geo-referenced Target within the right-of-way using a Substance detection technique based on pixel DN's and a selected wavelength.

6. The system of claim 5 wherein the Substance detection technique includes the NASA Hydrocarbon Detection Index applied to at least one of hydrocarbon and chemical industry regulatory compliance, hydrocarbon and chemical infrastructure integrity validation, leak detection and product speciation.

7. The system of claim 1 wherein the vegetation index includes the Sims and Gamon Modified Normalized Difference Vegetation Index (mNDindex) or the Rondeaux et al. Optimized Soil-Adjusted Vegetation Index (OSAVI).

8. The system of claim 1 wherein the weight and volume of the HSI sensor is less than or equal to 10 kg and 16000 cm3 respectively.

9. The system of claim 1 wherein the Target includes buried or submerged pipeline within a right-of-way.

10. The system of claim 1 wherein the processor and memory are configured for monitoring frequency requirements, as per regulatory requirements, for both HVL and natural gas assets throughout the Earth and including a plurality of space-based platforms integrated with hyperspectral imaging (HSI) sensors.

11. The system of claim 1 wherein the processor and memory are configured for processing and storing data from, a Sun-Synchronous Orbit (SSO)/high-inclination constellation configuration of as a few as five space-based sensor platforms to fulfill monitoring frequency requirements, a minimum of 26 times a year for liquid pipelines and a minimum of 4 times a year for gas pipelines, as per regulatory requirements, for both HVL and natural gas assets throughout the Earth.

12. A method of detecting pipeline leaks comprising:
   imaging a Target area with a hyperspectral imaging (HSI) sensor to generate a plurality of images including pixels representative of the Target area;
   extracting spectral signatures for each pixel in each image of the Target area based on ground-truthing measurements of hydrocarbon spectral signatures;
   correlating the extracted spectral signatures to a respective spectral reference library using an endmember extraction algorithm, wherein the extracted spectral signature corresponds to a ground-truthing measurement of hydrocarbon spectral signatures; and
   monitoring a vegetation index for a Target area over time and triggering an alert to investigate upon detection within 7 days of the vegetation index being over a threshold percent based on a plurality of contiguous pixels related to a Target area.

13. The method of claim 12, wherein Extracting spectral signatures for each pixel in a corresponding Target Area is performed with the use of sequential maximum angle convex cone (SMACC) method.

14. The method of claim 12, wherein the endmember extraction algorithm is performed on-board a space-based sensor platform.

* * * * *